Figure 1:
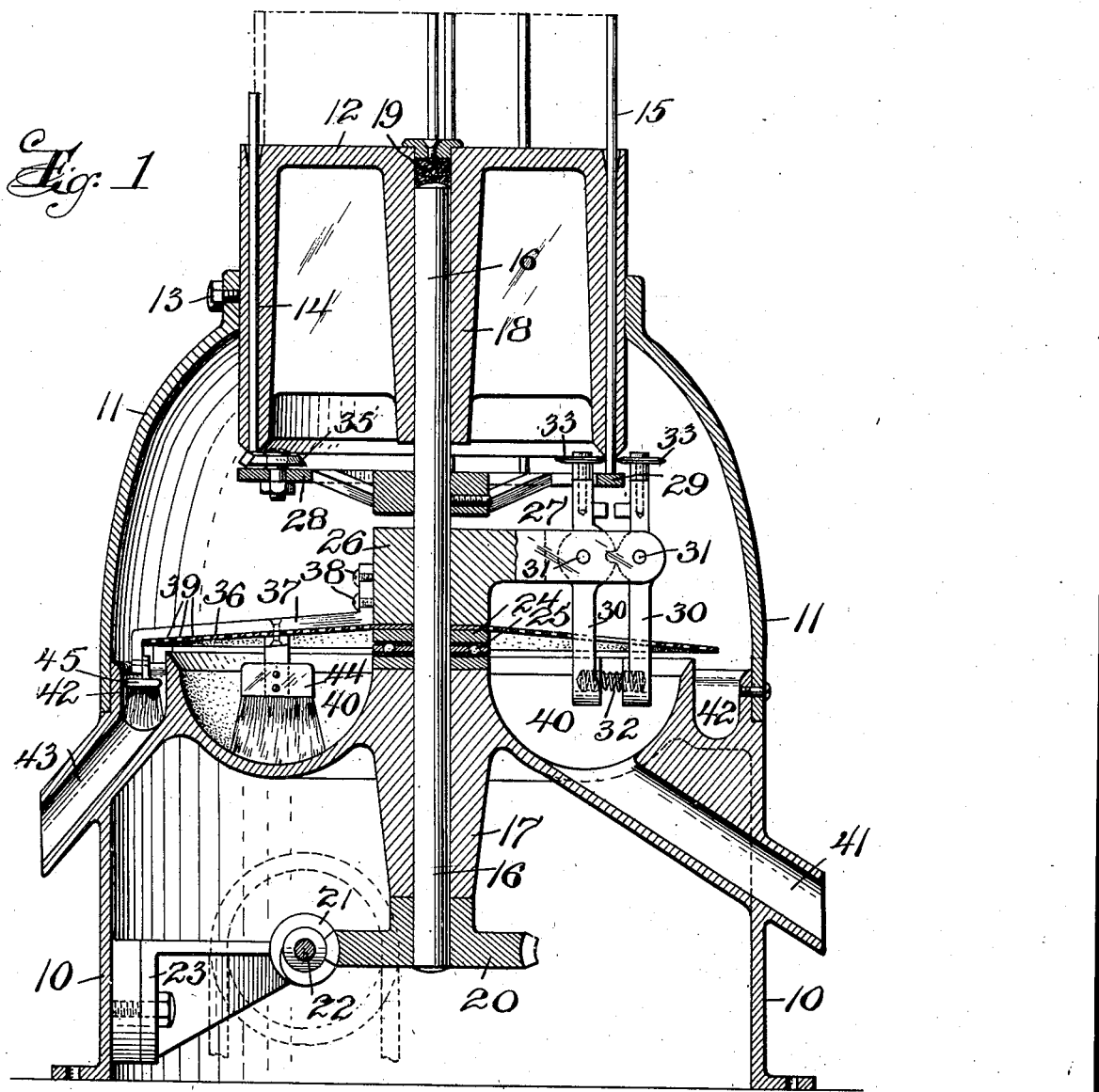

Sept. 14, 1937.  C. EISLER  2,093,147
MACHINE FOR MAKING BEADS FROM GLASS RODS AND TUBES
Filed June 24, 1936  2 Sheets-Sheet 2
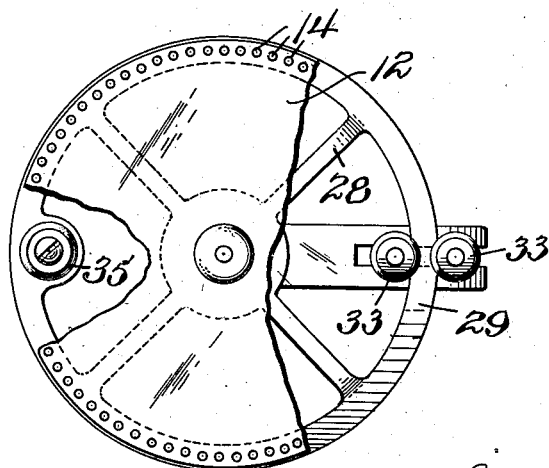
Fig. 2
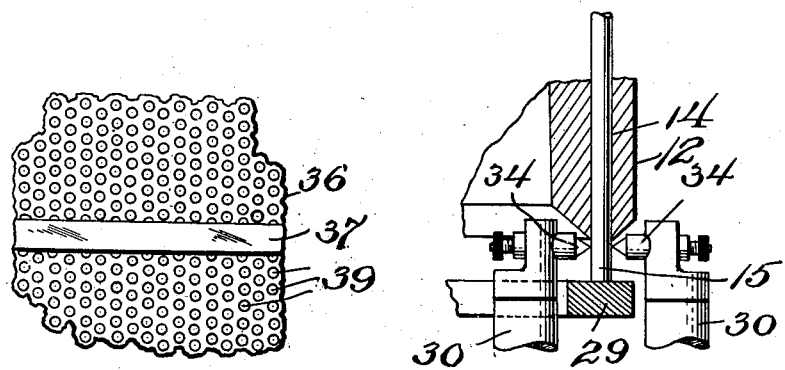
Fig. 4
Fig. 3
INVENTOR
Charles Eisler,
BY
Wm H Caufield,
ATTORNEY.

Patented Sept. 14, 1937

2,093,147

UNITED STATES PATENT OFFICE 2,093,147

MACHINE FOR MAKING BEADS FROM GLASS RODS AND TUBES

Charles Eisler, South Orange, N. J.

Application June 24, 1936, Serial No. 87,003

7 Claims. (Cl. 49—48)

This invention relates to an improved machine for making beads from glass rods or tubes, the beads being used primarily for supporting various elements in electrical lighting and radio tubes, and usually of cylindrical form.

The machine is adapted for the rapid breaking of a series of glass rods or tubes into beads, the machine being preferably enclosed to confine fragments and dust until it is deposited from an outlet.

The machine is also designed to concentrate the beads broken off from the rods or tubes and deliver them from an outlet. It is also possible with my new machine to vary the length of the beads or tubes, within certain limitations by adjustment within the machine.

The invention is illustrated in the accompanying drawings. Figure 1 is a vertical section of a machine embodying my invention with the shaft and some associated parts shown in elevation. Figure 2 is a plan view of the holder for the glass rods which is broken away to show the nicking and breaking devices underneath. Figure 3 is a detail of a sieve employed in the machine. Figure 4 is a detail section of a modified form of nicking device.

The machine comprises a casing or frame having a lower or base member 10 and an upper dome-like member 11. The holder 12 is secured to the dome-like member and forms the top of the machine. The members 10 and 11 and the holder 12 form a closed casing which is preferred as a safety measure and to confine dust and beads resulting from the operation of the machine. The holder 12 is adjustable vertically and is held in place by the bolts 13. The holder is provided with a series of annularly arranged bores 14 in which the glass rods or tubes 15 are placed and fit freely enough to drop by gravity in the bores as the bottom ends are broken off to form the beads.

A shaft 16 rotates in the center of the machine and is supported by the bearing 17 in the base member 10 and in the bearing 18 in the holder 12. A felt pad 19 can be placed in the top of the holder for the purpose of supplying lubricant. The shaft can be driven by suitable mechanism in the base member 10, such as the worm gear 20 on the shaft 16 and a worm 21 on the driving shaft 22 mounted in a bearing 23 and extending out through the wall of the base member. The shaft is maintained in position by the flange 24 resting on the thrust bearing 25 which rests in turn on the top of the bearing 17. A bracket 26 is secured to the shaft and has a projecting arm 27 which supports a suitable nicking device.

The plate or spider 28 is secured to the shaft 16 and has the annular part 29 disposed under the row of bores 14 and acts as a support for the glass rods. The annular part 29 is flanked by a pair of arms 30 which are pivoted intermediate their ends at 31 to yieldingly press inwardly at the top where the nicking elements are located to engage the glass rods. The plate 28 is spaced from the bottom of the holder 12 and in this space the nicking elements operate. The wheels 33 are shown as the nicking elements in Figure 1 and in Figure 4 I show the points 34 as alternative means. These nicking elements are made of any of the well-known materials adapted for use in marking or cutting glass.

On the plate 28 and preferably diametrically opposite the nicking elements is a breaking element usually in the form of a freely rotatable tapered disc 35. This wheel is so placed that its periphery rolls along the nicked ends of the glass rods and projects far enough to insure the breaking of the bead from the rod and the expulsion of the bead from the plate 28.

A sieve 36 is secured by arms 37 to bracket 26 by screws 38, or the like, and is substantially rigid, being provided with holes 39. The sieve is dished and inclines outwardly to cause dust and fragments to drop through the holes 39 and shed beads off the outer edge of the sieve. Troughs are provided under the sieve to receive the dust and beads. These troughs are preferably cast into the base member 10. The trough 40 is arranged under the sieve to receive dust therefrom and is annular. The trough 40 has an outlet 41 leading to the outside of the casing. Under the edge of the sieve is the annular trough 42 adjacent the inside edge of the dome-like upper member 11. The trough 42 has a separate outlet 43. Wipers, usually in the form of brushes, are arranged in the troughs to sweep around in the troughs and deposit the contents into the respective outlets. I show the brushes as secured to the sieve, the brushes 44 cleaning the trough 40 and the brush 45 cleaning the trough 42.

The machine is operated by first placing the rods 15 in the bores 14. The machine is started and the nicking device proceeds from rod to rod nicking each one on opposite sides. The nicked rods are then engaged by the breaking device, such as the wheel 35 and are broken off. When so detached the beads either spring out against the member 11 and then fall into the trough 42 or they drop in the sieve 36 and fall off the edge of it. All dust falls to the sieve and passes down to the trough 40 and out through the outlet 41. The beads are delivered from the outlet 43. The enclosing casing confines all dust and fragments and also beads to the inside of the machine.

In the description of the machine, while glass rods are described, it will be evident that the term rods also includes tubes and it will be further evident that readily breakable material other than glass is included in the material on which the machine can operate.

I claim:

1. A machine for making beads from glass rods comprising a holder having annularly arranged bores for vertically supporting glass rods, a plate spaced from the bottom of the holder and supporting the bottom of the rods, a nicking device rotatably arranged to nick the rods successively above the plate, a breaking device rotatably arranged in the space and adapted to break the bead from the rod and means for rotating the plate and the devices in unison and a stiff dished sieve rotatable under the devices for shifting dust from the beads and shedding the beads from the edge.

2. A machine for making beads from glass rods comprising a frame, a holder at the top of the frame having annularly arranged bores for vertically supporting glass rods, a shaft rotatable in the frame and the holder, a plate on the shaft and spaced from the holder to support the rods at their bottoms, a nicking device secured to rotate with the shaft and engage the rods successively in the space, a rotatable breaker on the plate to successively break the beads from the nicked rods and a stiff sieve on the shaft to receive the beads and inclined outwardly to shed beads therefrom.

3. A machine for making beads from glass rods comprising a frame, a holder at the top of the frame having annularly arranged bores for vertically supporting glass rods, a shaft rotatable in the frame and the holder, a plate on the shaft and spaced from the holder to support the rods at their bottoms, a nicking device secured to rotate with the shaft and engage the rods successively in the space, a rotatable breaker on the plate to successively break the bead from the nicked rods, a stiff sieve on the shaft to receive the beads and inclined outwardly to shed beads therefrom, the frame having an annular trough under the sieve and having an inclined outlet, the machine having an annular trough under the edge of the sieve for receiving beads, separate outlets for the trough and wipers in the trough, said wipers rotating with the shaft.

4. A machine for making beads from glass rods comprising a frame, a holder at the top of the frame having annularly arranged bores for vertically supporting glass rods, a shaft rotatable in the frame and the holder, a plate on the shaft and spaced from the holder to support the rods at their bottoms, a nicking device secured to rotate with the shaft and engage the rods successively in the space, a rotatable breaker on the plate to successively break the bead from the nicked rods, a stiff sieve on the shaft to receive the beads and inclined outwardly to shed beads therefrom, the frame having an annular trough under the sieve and having an inclined outlet, the machine having an annular trough under the edge of the sieve for receiving beads, separate outlets for the trough and wipers in the trough, said wipers being secured to the sieve and rotatable therewith.

5. A machine for making beads from glass rods comprising a frame, a holder for vertically supporting glass rods in annular relation, a shaft rotatable in the frame, a plate on the shaft for supporting the bottoms of the rods, a bracket on the rod, pivoted arms on the bracket, a pair of nicking elements on the arms and placed to engage the rods successively near the bottom thereof, a spring to force the arms together at the nicking elements, a breaking disk on the plate with its path arranged to insure breaking of the nicked ends of the rods from the rods, a sieve of dished form to receive and shed beads and sift the dust therefrom.

6. A machine for making beads from glass rods comprising a frame, a holder for vertically supporting glass rods in annular relation, a shaft rotatable in the frame, a plate on the shaft for supporting the bottoms of the rods, a bracket on the rod, pivoted arms on the bracket, a pair of nicking elements on the arms and placed to engage the rods successively near the bottom thereof, a spring to force the arms together at the nicking elements, a breaking disk on the plate with its path arranged to insure breaking of the nicked ends of the rods from the rods, a sieve of dished form to receive and shed beads and sift the dust therefrom, the frame having a trough for the dust and a trough for the beads, separate outlets for the troughs, and wipers in the troughs and secured to the sieve.

7. A machine for making glass beads from glass rods comprising a frame including an upper dome-like part, a holder for annularly arranged glass rods in the top of the frame, the frame and holder forming a closed casing, a plate supporting the bottoms of the rods and spaced from the bottom of the holder, a shaft in the frame and the holder, and on which the plate is mounted, a bracket on the shaft under the plate, a pair of spring actuated nicking devices rotated by the shaft to successively engage the rods in the space, a rotatable breaking disc on the plate to successively break the nicked ends from the rods to form beads, a dished sieve under the plate, an annular trough under the edge of the sieve and at the bottom of the dome for receiving beads from the sieve and rebounding from the walls of the dome, separate outlets for the troughs, and wipers to rotate with the shaft for passing materials from the troughs into their outlets.

CHARLES EISLER.